COMMUNICATING SYSTEM
Original Filed Dec. 30, 1938
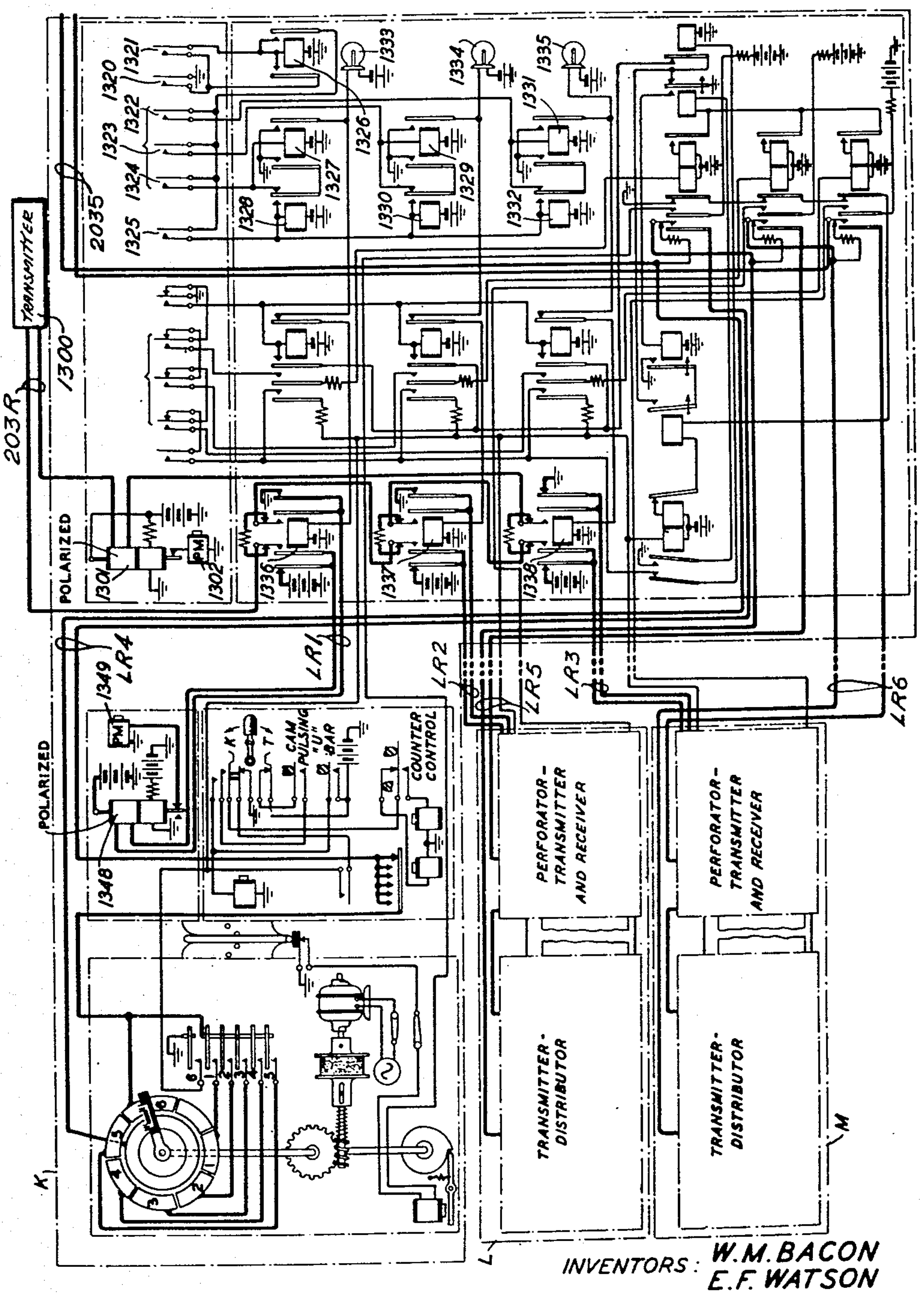
INVENTORS: W. M. BACON
E. F. WATSON
BY J. W. Schmied
ATTORNEY

UNITED STATES PATENT OFFICE 2,560,266

COMMUNICATING SYSTEM

Walter M. Bacon, New York, and Edward F. Watson, Larchmont, N. Y., assignors to Bell Telephone Laboratories, Incorporated, New York, N. Y., a corporation of New York Original application December 30, 1938, Serial No. 248,426. Divided and this application September 25, 1948, Serial No. 51,228

2 Claims. (Cl. 178—2)

This invention relates to communication systems and more particularly to switching and interconnecting arrangement for telegraph systems.

This application is a division of our copending application Serial No. 248,426, filed December 30, 1938, now Patent 2,495,682, patented Jan. 31, 1950.

An object of the invention is to reduce the switching time required to switch successive messages to successive lines of a storage controlled automatic telegraph switching system.

Another object is to provide a switching arrangement in which switching control means, operating in response to a conditioning code combination, which may be otherwise called a preparatory code combination, prepares switching circuits for subsequent correct response to a disconnect code combination, which may otherwise be called a clearing code combination, and to a switching code combination which connects a receiving circuit into connection with the source of signals which supplies the conditioning, disconnect, and switching codes.

The details of an exemplary embodiment of the invention fulfilling the foregoing and other objects and including the foregoing features of this invention may be more readily understood from the following description, when read with reference to the attached drawing in which the single figure of the drawing discloses the novel features of apparatus exemplifying the invention with cooperating elements of well-known construction and operation disclosed partially in detail and partially diagrammatically.

The arrangement disclosed in the drawing consists of an incoming conductor pair 203R over which signals are received from a transmitter 1300 diagrammatically illustrated. For the purpose of the present invention this transmitter may be any one of a number of conventional types of telegraphic start-stop five unit permutation code transmitters such as are disclosed or referred to in the parent specification above identified. For the purpose of the present invention it may be assumed that this transmitter is connected to the receiving line 203R at any suitable point for the purpose of emitting such start-stop five unit code signals thereupon and it may preferably be a tape controlled transmitter. The manner in which such a tape controlled transmitter becomes connected to such a receiving line to emit signals thereupon is fully disclosed in the parent application but the present invention does not depend upon the manner in which this is done; indeed, it may be assumed that the transmitter is permanently connected to the line. The incoming line 203R is connected through the operating winding of the receiving relay 1301 in series with certain normally closed contacts of relays 1336, 1337 and 1338. The apparatus disclosed in the rectangle dotted in the upper right three-quarters of the figure is assumed to be located at a station K. Other stations L and M are duplicates of those elements of station K which are in the upper left quarter of the drawing. Stations L and M are assumed to be in offices remote from the station K and are connected thereto by receiving branch conductors LR2 and LR3. The receiving apparatus at station K is likewise connected by a receiving branch conductor LR1. However, any of the lines LR1, LR2 and LR3 may be long or short and may terminate in the same or a different office without departure from the mode of operation of the apparatus or from the principle of operation of the invention; furthermore, other similar stations may be provided in an obvious manner.

The drawing includes a disclosure of transmitting lines LR4, LR5 and LR6 by which the transmitting apparatus of any of stations K, L or M may be connected to an outgoing conductor pair 203S for transmission in an outgoing direction over said conductor pair. The manner of operation of this transmitting equipment is fully disclosed and the essential and novel features thereof claimed in the aforesaid parent application. Inasmuch as the inventive features claimed hereinafter do not depend upon the presence of this transmitting equipment or its mode of operation they will not be further described herein. A full description is found in the parent specification referred to above.

At the station comprising the right-hand portion of station K connected to the receiving branch of the party line 203R, the armatures of the receiving relay 1301 is operated to its spacing positions in response to these spacing impulses transmitted by the automatic transmitter described above. The operation of this relay to its spacing position interrupts an obvious circuit through the respective selector magnet 1349. This selector magnet is somewhat similar to the printer magnets of a teletypewriter mechanism and controls a selector mechanism which is essentially the same as the selector mechanism of a printing telegraph receiving instrument. However, for the purpose of controlling switching operations, instead of causing characters to be printed, this selector mechanism is arranged to selectively control and close certain contacts in response to reception of permutation code combinations and telegraph impulses.

This permutation code selector is provided with a number of contacts which are selectively controlled by the permutation code selector. It is provided with a contact which is controlled by a movable member which corresponds to a platen of a teletypewriter. When this platen member is operated to its figures or upper case position, it closes a contact controlled thereby and maintains this contact closed as long as this member remains in its figure position. When this member is returned by the selecting mechanism to its letters position or lower case, it will open this contact. This selector at all of the subscribers' stations is also provided with a contact hereinafter referred to as a "universal" contact which momentarily operates once for each code combination received by the selecting mechanism. In the preferred embodiment of this invention this contact is preferably operated by the locking member which locks each received selection on the permutation elements which are sometimes called code bars. However, this contact may be controlled by any member of the selecting apparatus which operates once and at an appropriate time for each code combination received. For example, this contact may be controlled from a cam mounted on the selection cam shaft or it may be controlled by a cam mounted on the function shaft or by the printing bail or any other suitable element which operates once for each received code combination.

The remaining contacts controlled by the permutation code selector controlled by magnet 1349 is preferably controlled by the code bars selected by the received code combinations. These code bars instead of operating type bars as in a teletypewriter or receiving telegraph printing apparatus cause the contacts associated with them to be momentarily operated. The selecting equipment has contacts associated with a particular release code bar, for example, the code bar which would normally operate the letter V-type bar of the teletypewriter. The selecting equipment has an activating contact which is similarly controlled by the same pull bar at each of the stations as, for example, the pull bar which normally operates the letter X-type bar.

All of the other contacts for switching selectively the source of signals comprising the line path 203R to one or another of the receivers of stations K, L or M may be operated by different pull bars. For example, to connect on station K, contacts may be associated with the K pull to connect on station L contacts may be operated by the L pull bar to connect on station M contacts may be operated by the M pull bar, etc. for any other stations, if any, which may be controlled by the selector.

The details of the selecting mechanism have not been shown because they are well known and operate in their usual manner. For a detailed description of devices of this kind, reference may be had to the following United States patents, the disclosures of which are hereby made a part of this present specification as if fully included herein. 2,112,234 granted to Beattie et al., March 29, 1938; and 2,120,235 granted to Beattie et al., June 14, 1938. Of course, the circuits controlled by the selector contacts in the present application operate differently than the circuits controlled by the selector contacts in these patents. As stated in Beattie et al. Patent 2,120,235, the various pull bars of the selecting mechanisms of teletypewriters may be used for performing their regular printing functions in response to lower case selections.

The details of operation the circuit arrangements in accordance with this invention which are controlled by the selector contacts will be described in detail with reference to the circuits shown in the sole figure of the drawing and located at station K. For the purpose of illustrating operations in accordance with the present invention, it may be assumed that the transmitter 1300 is emitting onto the line 203R a sequence of permutation code combinations in which each message ends with a "letters" character followed by a "figures" code combination, an activate code combination, which we may assume is that corresponding to the letter "X," a disconnect code, a switching code combination such as "K," "L" or "M," followed by a message beginning with a "letters" code combination which is again followed by a sequence consisting of "figures," activate, disconnect, a switching code combination and another message.

The figures combination when it is repeated and transmitted over the receiving channel of the party line 203R will be received by the selecting mechanism at station K. Receiving relay 1301 of the permutation code selector follows the impulses received over the receiving channel of the party line 203R and repeats them to the selecting magnet 1302. Selector magnet 1302 actuates the selecting mechanism and causes it to close the contacts 1320. Contacts 1320 are controlled by a member which corresponds in its motions to the motions of the platen of a teletypewriter. The platen of the teletypewriter when shifted to the figure position remains in this position until unshifted by a later code combination. The contacts 1320 are arranged to remain closed so long as the platen-like member remains in the shifted or figures position.

The next code combination transmitted from the subscriber's station and repeated through the central station will be an activating code combination which will momentarily close contacts 1321. The operation of contacts 1321 completes a circuit for the operation of relay 1326 from ground through the operated contacts 1320 and 1321 to battery through the winding of relay 1326. Operation of relay 1326 completes a circuit for maintaining itself operated from ground through contacts 1320 and operated left-hand contacts of relay 1326 to battery through the windings of relay 1326. The next code combination transmitted from the subscriber's station and received by the selector at station K will be a code combination selecting the particular station for which the message is intended. Since the message is intended for station K it will be assumed that the next code combination will be the same combination as assigned to the letter K. When this code combination is received by the line relay 1301 and repeated to the selecting magnet 1302, selecting magnet 1302 will cause the selecting mechanism at station K to momentarily close contacts 1324. The closing of contacts of 1324 at this time completes a circuit for the operation of relay 1327 from ground through the operated contacts 1320 and operated right-hand and left-hand contacts of relay 1326, the operated contacts 1324 to battery through the winding of relay 1327. Relay 1327 in operation completes a locking circuit from ground through its left-hand operated contacts, the break contacts of relay 1328 to battery through the winding of relay 1327. The operation of relay 1327 completes an obvious circuit for lighting lamp 1333 to indicate to the attendant at station K that the receiving channel of the party line is connected to station K. Operation of relay 1327 also completes a circuit for the operation of relay 1336 from battery through the winding of relay 1336, the right-hand break contacts of relay 1339 to ground through the right-hand operated contacts of relay 1327.

The operation of relay 1336 connects the receiving relay 1348 to the receiving channel of the party line 203. The next combination transmitted by the subscriber's station which will be repeated through the central station will be a letters combination. This letters combination will be repeated by both the line relay 1301 at station K and the line relay 1348 of the teletypewriter. The relay 1348 will follow these signals and repeat them to the printing magnet 1349 of the receiving teletypewriter. However, as this is a letters signal it records no character and produces no effect on the teletypewriter unless the teletypewriter had been previously left in upper case in which case the letters signal will restore it to the lower case. At station K the selecting magnet 1302 will follow these signals and will cause the selector to open the contacts 1320 which in turn causes relay 1326 to release.

Thereafter the code combinations perforated in the tape 501 at the subscriber's station will be transmitted to the receiving teletypewriter at station K through the tape transmitter at station A, the transmitting channel of party line 201, the reperforator 1002 and retransmitter 1101 at the central station, the receiving channel of the party line 203 to the teletypewriter at station K where they are recorded. The line relay 1301 repeats all of these impulses to the selector magnet 1302. However, these impulses produce no effect upon the selector equipment because it has not been activated. The selecting mechanism will close the various contacts when the respective code combinations are received. However, since the switching controlling relays operated by these contacts are not properly operated to perform a switching operation the actuation of these contacts at this time produces no effect upon the line switching relays 1336, 1337 and 1338.

At the termination of the message the subscriber at station A will perforate the figures signal combination in the tape followed by an activating combination. The activate signal may be any available code but as set forth hereinbefore may be the "X" code. The figures combination when received at station K by the selecting magnet 1302 will cause contacts 1320 to operate. Then the activating signal combination will cause the selecting mechanism to momentarily close the activating contacts 1321. This completes a circuit for the operation of relay 1326 as described above. The next combination perforated in the tape by the subscriber will be a disconnect signal, for example, the letter V. When this disconnect signal is received by the selecting magnet 1302 to station K it will cause the selecting mechanism to momentarily close the contacts 1325. This completes a circuit for the operation of relay 1328 from ground through the operated contacts 1320, the operated contacts of relay 1326, the operated contacts 1325 to battery through the windings of relays 1328, 1330 and 1332. The operation of relays 1330 and 1332 in this circuit at this time produces no useful function. Operation of relay 1328 interrupts the locking circuit of relay 1327 and allows this relay to release. Relay 1328 in operating completes a locking circuit from ground through the left-hand operated contacts of relay 1327 through its own operated contacts and a winding to battery which circuit insures that relay 1328 will remain operated sufficiently long to cause relay 1327 to fully release. The release of relay 1327 interrupts the circuit of relay 1336 and permits this relay to release. The release of relay 1327 also interrupts the circuit of lamp 1333 thus causing this lamp to be extinguished. The release of relay 1336 disconnects the receiving relay 1348 of the receiving teletypewriter at station K from the receiving channel of party line 203 and reestablishes a local circuit through the upper winding of the receiving relay 1348 to maintain it in its marking position thus maintaining the teletypewrter at station K in its normal condition.

If the next message is intended for station L or M, the next signal over the line from the transmitter 1300T will be the letter L or M followed by a letters signal then followed by the message to the corresponding station L or M. This would cause the selector controlled by the selecting magnet 1302 to operate either relay 1329 or 1331 as the case may be. The operation of these relays in turn will cause the operation of relays 1337 or 1338, respectively, to connect the receiving apparatus at station L or M to the receiving channel of the party line 203.

The characteristic feature of operation therefore is that the transmitter 1300, which may be any transmitter connected to line 203R in any manner, transmits a sequence of characters consisting of a message to any station K, L or M followed by a code combination which activates or readies the switching equipment, a code combination which then clears the connection to any connected station K, L or M then established by releasing whichever of relays 1336, 1337 or 1338 happens to be operated; then followed by a switching signal which connects on one or another of stations K, L or M, following which the message intended therefor is transmitted whereupon the sequence of events may be repeated.

The specific manner in which a transmitter such as the transmitter 1300 may become connected to line 203R to transmit a series of messages thereover intended for one or another of stations K, L or M is fully described in the parent specification above referred to.

What is claimed is:

1. A telegraph switching system comprising a signal source for supplying sequences of message signals comprising an indefinite number of messages each of which is followed by and separated from the succeeding message by an activating signal, a disconnecting signal and a line connecting signal characterized in that means for switching the said messages selectively to any one of a plurality of outgoing lines comprises means first responsive to the activate signal for preparing for reception of the disconnect signal, by means responsive to the disconnect signal for disconnecting any one of said lines, and means responsive to the switching signal for selectively completing a connection of said source with a predetermined outgoing line.

2. In a system for the automatic switching of telegraph messages, the combination of a source of telegraph signals including a ready signal, a clearing signal and a switching signal transmitted in advance of the message characters, a plurality of outgoing lines switching means for connecting said source to any one of said outgoing lines, means responsive to the receipt of said ready signal for preparing said switching means for operation by said clearing signal, means responsive to the receipt of said clearing signal for clearing all connection between said source and said outgoing lines, and means responsive to receipt of said switching signal for completing a connection between said source and a predetermined outgoing line.

WALTER M. BACON.
EDWARD F. WATSON.

REFERENCES CITED

The following references are of record in the file of this patent:

UNITED STATES PATENTS

| Number | Name | Date |
|---|---|---|
| Re. 20,462 | Kleinschmidt | Aug. 3, 1937 |
| 1,370,669 | Potts | Mar. 8, 1921 |
| 1,943,475 | Gurley | Jan. 16, 1934 |
| 2,023,952 | Dirkes | Dec. 10, 1935 |